(12) United States Patent
Ramesh et al.

(10) Patent No.: US 7,203,691 B2
(45) Date of Patent: Apr. 10, 2007

(54) SYSTEM AND METHOD FOR RETRIEVING INFORMATION FROM A DATABASE

(75) Inventors: Bhashyam Ramesh, San Diego, CA (US); Steven B. Cohen, Redondo Beach, CA (US); John R. Catozzi, San Diego, CA (US)

(73) Assignee: NCR Corp., Dayton, OH (US)

( * ) Notice: Subject to any disclaimer, the term of this patent is extended or adjusted under 35 U.S.C. 154(b) by 493 days.

(21) Appl. No.: 10/256,712

(22) Filed: Sep. 27, 2002

(65) Prior Publication Data

US 2004/0062106 A1 Apr. 1, 2004

(51) Int. Cl.
*G06F 17/30* (2006.01)
(52) U.S. Cl. .................... 707/101; 707/102; 707/1
(58) Field of Classification Search .............. 707/1–10, 707/100–104.1, 200–203, 205; 715/792; 711/134, 137, 165

See application file for complete search history.

(56) References Cited

U.S. PATENT DOCUMENTS

| 5,758,345 | A | * | 5/1998 | Wang | 707/100 |
| 6,449,695 | B1 | * | 9/2002 | Bereznyi et al. | 711/134 |
| 6,728,840 | B1 | * | 4/2004 | Shatil et al. | 711/137 |
| 6,912,695 | B2 | * | 6/2005 | Ernst et al. | 715/792 |
| 6,963,959 | B2 | * | 11/2005 | Hsu et al. | 711/165 |

\* cited by examiner

*Primary Examiner*—Yicun Wu
(74) *Attorney, Agent, or Firm*—Baker Botts; Charles Q. Money

(57) ABSTRACT

A method for retrieving information from a database includes identifying a cylinder. The cylinder includes a plurality of data segments. The method also includes retrieving the plurality of data segments from the cylinder during a single retrieval operation. In addition, the method includes storing the plurality of data segments in a cache.

26 Claims, 8 Drawing Sheets

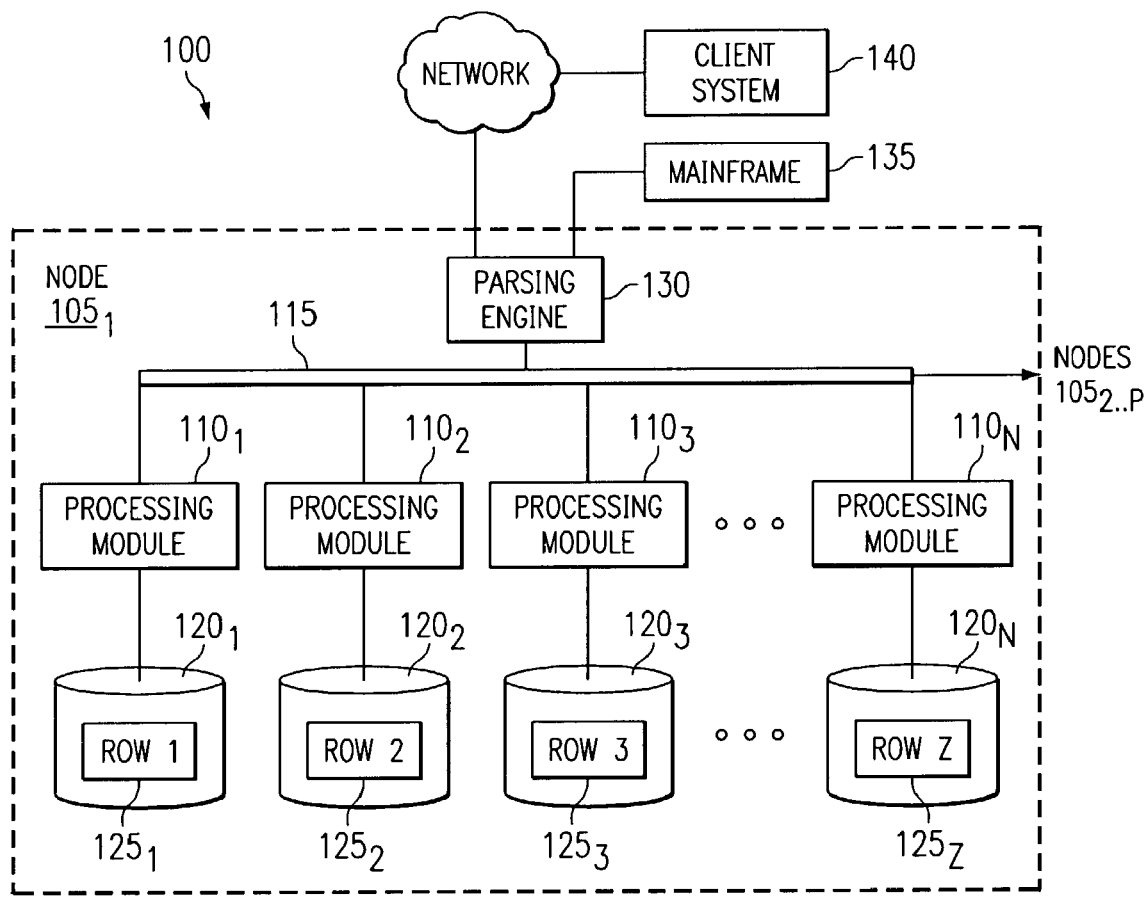
FIG. 1
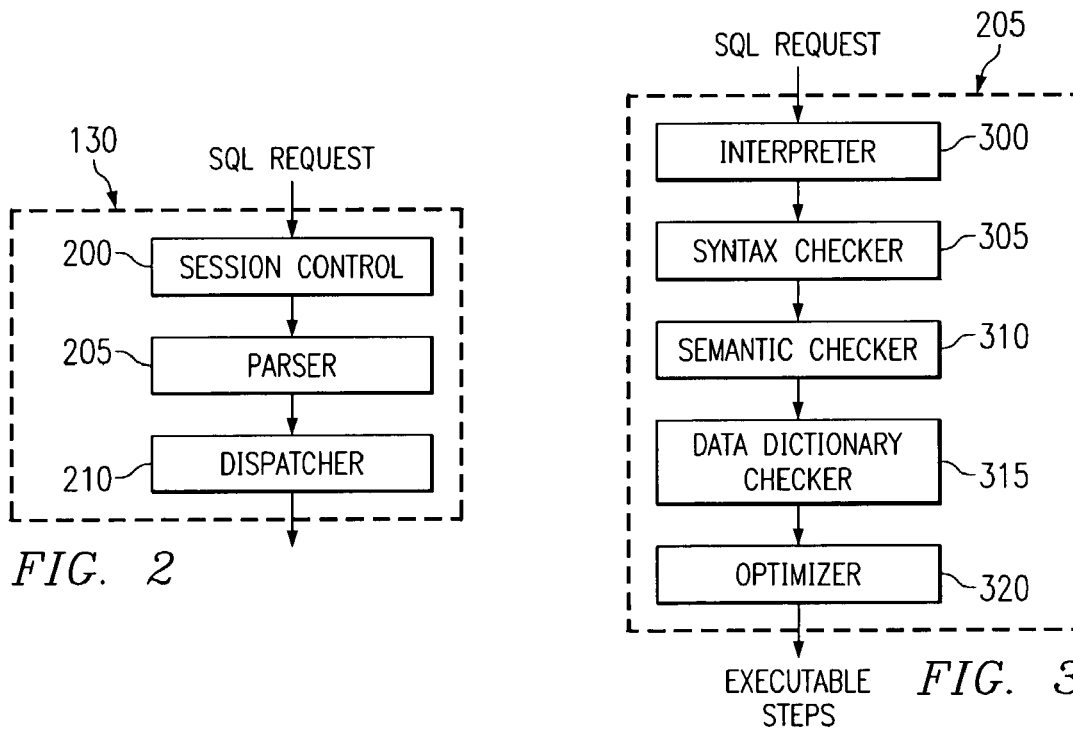
FIG. 2
FIG. 3

| DATA SEGMENT NUMBER | BEGINNING LOGICAL ADDRESS | ENDING LOGICAL ADDRESS | SIZE |
|---|---|---|---|
| 0 | $A_0$ | $B_0$ | $S_0$ |
| 1 | $A_1$ | $B_1$ | $S_1$ |
| 2 | $A_2$ | $B_2$ | $S_2$ |
| ⋮ | ⋮ | ⋮ | ⋮ |
| N | $A_N$ | $B_N$ | $S_N$ |

| CYLINDER NUMBER | BEGINNING LOGICAL ADDRESS | ENDING LOGICAL ADDRESS |
|---|---|---|
| 0 | $C_0$ | $D_0$ |
| 1 | $C_1$ | $D_1$ |
| 2 | $C_2$ | $D_2$ |
| ⋮ | ⋮ | ⋮ |
| M | $C_N$ | $D_N$ |

SYSTEM AND METHOD FOR RETRIEVING INFORMATION FROM A DATABASE

BACKGROUND

A conventional database system often includes at least one processor and different types of memory. The memory typically includes a shorter-term memory, such as random access memory, and a longer-term memory, such as a hard drive. The operating speeds of the processor and random access memory have increased dramatically in recent years, allowing the processor to perform operations faster and the random access memory to store and retrieve information more quickly. In contrast, the platters forming the hard drive have been getting larger, which has slowed the speed of input-output ("IO") operations involving the hard drive.

SUMMARY

This disclosure provides an improved system and method for retrieving information from a database that reduce or eliminate at least some of the shortcomings associated with prior approaches.

In one aspect, a method for retrieving information from a database includes identifying a cylinder. The cylinder includes a plurality of data segments. The method also includes retrieving the plurality of data segments from the cylinder during a single retrieval operation. In addition, the method includes storing the plurality of data segments in a cache.

In another aspect, a method for retrieving information from a database includes retrieving a plurality of data segments from a cylinder in a single operation. The method also includes generating a segment descriptor block for each of at least some of the retrieved data segments. Each segment descriptor block identifies a location of a corresponding data segment in a cache. The method further includes inserting each of the segment descriptor blocks into at least one of a plurality of first chains. In addition, the method includes moving one of the segment descriptor blocks from one of the first chains to one of a plurality of second chains when the data segment associated with the segment descriptor block is accessed. The segment descriptor blocks form a third chain within at least one of the first chains and the second chains.

One or more technical advantages may be provided according to various embodiments of this disclosure. Particular embodiments of this disclosure may exhibit none, some, or all of the following advantages depending on the implementation. For example, in one example, a system for retrieving information from a database is provided. In particular, the system can retrieve multiple data blocks from the database in fewer operations. Since the data blocks can be retrieved in fewer operations, this may help to reduce the amount of time needed to retrieve information from the database. Also, because less time is needed to retrieve the information, this may help to increase the operational speed of the database and the overall system.

Other technical advantages will be readily apparent to one skilled in the art from the following figures, descriptions, and claims.

BRIEF DESCRIPTION OF THE DRAWINGS

FIG. 1 is a block diagram of a node of a database system;
FIG. 2 is a block diagram of a parsing engine;
FIG. 3 is a flowchart of a parser;

FIGS. 11A and 111B are flowcharts of a method for generating segment descriptor blocks used to identify data segments from a database.

DETAILED DESCRIPTION

Figures 4A, 4B, 4C:
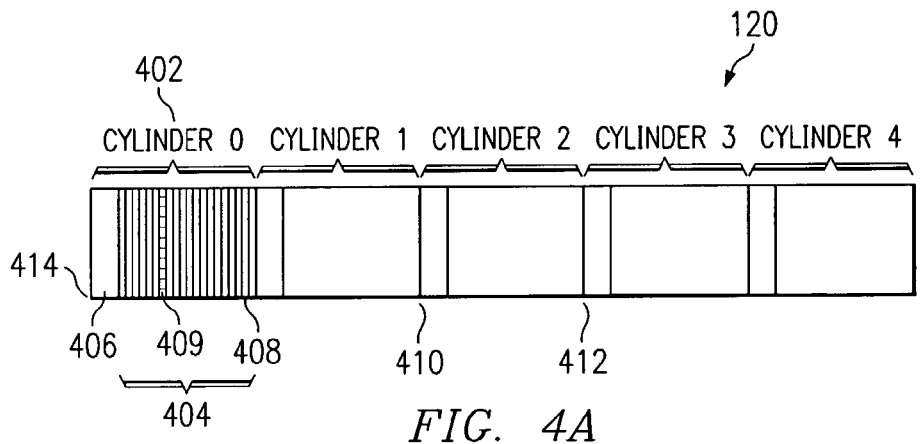
FIGS. 4A through 4C are block diagrams of a data-storage facility.

The information retrieval technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1...Z}$ are distributed across the data-storage facilities $120_{1...N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1...N}$ and associated processing modules $110_{1...N}$ by a hash bucket map. The characteristics of the columns chosen for the primary index determine how evenly the rows are distributed.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

A data-storage facility 120, illustrated in FIG. 4A, includes cylinders 402. A cylinder 402 represents a continuous block of disk space. Each cylinder 402 could have a fixed size, or cylinders 402 could have variable sizes. As one example, the cylinder 402 could be between one and two megabytes. In a particular system, a cylinder 402 represents 1,936 kilobytes of space, although other sizes could be used. Cylinder 402 may, but need not, match the size of the physical cylinders on the platters of a hard drive in a data-storage facility 120.

In the illustrated example, a cylinder 402 includes a cylinder data area 404 and a cylinder index 406. Cylinder data area 404 represents the portion of cylinder 402 that can be used to store information for DBS 100. For example, cylinder data area 404 could store data forming part of one or more database tables maintained by DBS 100. In one example system, the information in cylinder data area 404 is divided into data blocks 408. Data blocks 408 represent any suitable portion of a cylinder 402. As an example, a data block 408 could represent 48 kilobytes of space in a cylinder 402. Each data block 408 could be stored in one or more sectors 409 of data-storage facility 120. Each sector 409 could represent 512 bytes, although cylinders 402 having other sector sizes could also be used.

In a particular example system, a cylinder 402 spans an area of memory from a beginning logical address 410 to an ending logical address 412. Logical addresses 410, 412 may represent the offset or distance between a location in data-storage facility 120 and a base address 414 of data-storage facility 120.

Cylinder index 406 represents an index for the information contained in cylinder data area 404. In an example system, cylinder index 406 contains information about each data block 408 contained in cylinder 402, such as the starting sector 409 or other location and size of each data block 408. One example of a cylinder index 406 is shown in FIG. 4B, which is described below. In this specification, the term "each" refers to each of at least a subset of the identified items.

In one aspect of operation, a node 105 of DBS 100 may receive a request to retrieve information from one or more data-storage facilities 120. For example, node 105 may receive a request to retrieve information from one or more database tables, which may reside in one or more cylinders 402. When node 105 identifies a cylinder 402 containing at least some of the requested information, node 105 may generate a list of data blocks 408 in that cylinder 402 associated with the requested information. Node 105 may then identify a range of memory addresses to be retrieved from cylinder 402, and the identified data blocks 408 may reside between the memory addresses. The range of memory addresses could span the entire cylinder data area 404 or a portion of cylinder data area 404. Node 105 could then retrieve the data blocks 408 in the range of memory addresses from data-storage facility 120 in a single retrieval operation. After retrieving the data blocks 408, node 105 may perform any suitable function. For example, node 105 could store the data blocks 408 in a cache or other memory and make the data blocks 408 available to mainframe 135 or client computer 140.

Collectively retrieving the data blocks 408 from cylinder 402 may help to reduce the amount of time needed to retrieve information from data-storage facility 120 and/or reduce the amount of overhead involved in the retrieval operation. For example, the time needed to retrieve information from the data-storage facility 120 may include hardware overhead and software overhead. The hardware overhead may include the seek time of a data-storage facility 120. The seek time may include the time it takes for a read/write head in data-storage facility 120 to reach the starting location of the data to be retrieved. The software overhead may include the time it takes to process a data retrieval request and complete the request.

By reducing the number of operations needed to retrieve information from the data-storage facility 120, the total amount of hardware and software overhead may be reduced. This could also reduce the amount of time needed to retrieve the information from data-storage facility 120. As a particular example, performing eight retrieval operations may incur eight different seek times, while a single retrieval operation may incur a single seek time. As another particular example, data-storage facility 120 may include a 15,000 revolutions per minute (RPM), 18 gigabyte Cheetah III hard disk. The time needed to retrieve eight 48 kilobyte data blocks 408 in eight operations could approximately equal the time needed to retrieve an entire 1,936 kilobyte cylinder 402 in a single operation. In this particular example, retrieving the entire cylinder 402 may reduce the overhead associated with the retrieval, even though retrieving the entire cylinder 402 may or may not reduce the total time needed to retrieve the desired information.

As shown in FIG. 4B, cylinder index 406 contains information about the various data blocks 408 in a cylinder 402. In the illustrated example, cylinder index 406 includes a data segment number 420, a beginning logical address 422, an ending logical address 424, and a size 426 for each data block 408 in a cylinder 402. Other cylinder indexes 406 that include other or additional information could be used.

Data segment numbers 420 represent an index for the various data blocks 408 in a cylinder 402. In an example system, each data block 408 in a cylinder 402 has a unique data segment number 420. Beginning and ending logical addresses 422, 424 identify the location of data blocks 408 in data-storage facility 120. For example, beginning logical address 422 may represent the offset between the starting address 410 of a cylinder 402 and the beginning of a data block 408. Similarly, ending logical address 424 may represent the offset between the starting address 410 of cylinder 402 and the end of a data block 408. Size 426 represents the physical space occupied by a data block 408 in cylinder 402.

When node 105 receives a request to retrieve information, node 105 may identify a cylinder 402 containing data blocks 408 that store at least some of the requested information. Node 105 may also perform a retrieval operation to retrieve the cylinder index 406 from the identified cylinder 402 in data-storage facility 120. Node 105 may then use the information contained in cylinder index 406 to determine what portion of cylinder data area 404 to retrieve. For example, node 105 may determine the beginning logical address 422 of the first data block 408 to be retrieved from cylinder 402 and the ending logical address 424 of the last data block 408 to be retrieved from cylinder 402. Node 105 could then retrieve multiple data blocks 408 that reside between the two identified addresses during another retrieval operation.

In this example, node 105 performs two retrieval operations, one to retrieve the cylinder index 406 and one to retrieve the data blocks 408. Without this retrieval technique in place, node 105 might need to perform a large number of retrieval operations, one to retrieve the cylinder index 406 and many to retrieve the data blocks 408.

As shown in FIG. 4C, a master index 450 containing information about each cylinder 402 can be used to facilitate access to cylinders 402. In the illustrated example, master index 450 includes a cylinder number 452, a beginning logical address 454, and an ending logical address 456 for each cylinder 402. Other master indexes 450 that include other or additional information could also be used.

Cylinder numbers 452 represent an index for the various cylinders 402 in data-storage facility 120. In an example system, each cylinder 402 in data-storage facility 120 has a unique cylinder number 452. Beginning and ending logical addresses 454, 456 identify the location of each cylinder 402 in data-storage facility 120. For example, beginning logical addresses 454 may correspond to addresses 410 from FIG. 4A. Ending logical addresses 456 may correspond to addresses 412 from FIG. 4A.

Node 105 may use master index 450 to access particular cylinders 402 containing information to be retrieved. For example, node 105 may identify a cylinder 402 containing information requested by mainframe 135 or client computer 140. Node 105 may then access master index 450 and identify the beginning logical address 454 of that cylinder 402. Using the beginning logical address 454, node 105 can access the cylinder 402, retrieve cylinder index 406, identify the portion of cylinder 402 to retrieved, and retrieve multiple data blocks 408.

In one example system, various characteristics of the collective retrieval function described above can be controlled by a user. For example, the function allowing retrieval of part or all of a cylinder 402 may be turned on and off in DBS 100 during system initialization or restart. Also, the user could specify the minimum number of data blocks 408 to be collectively retrieved from a cylinder 402. Further, the user could specify a ratio of unused sectors 409 versus used sectors 409. In this example, when node 105 receives a request to load information, node 105 may identify the data blocks 408 containing the requested information in a particular cylinder 402. Node 105 may also identify a range of sectors 409 to be retrieved from cylinder 402, where the range includes the data blocks 408 to be retrieved. Node 105 may further identify the total number of sectors to be read from cylinder 402 and the number of sectors forming data blocks 408 that actually contain the requested information. As described below, unallocated space and/or unrelated data blocks 408 could reside in cylinder 402, and these may occupy some of the retrieved sectors 409. If the ratio between unused sectors (containing unrelated information, as described below) versus sectors actually containing the requested information is greater than a threshold, node 105 may individually retrieve the data blocks 408 from cylinder 402. In this case, the overall time needed to individually retrieve the data blocks 408 that contain the requested information may be less than the time needed to collectively retrieve the contents of the cylinder 402. This may occur, for example, when a large portion of a cylinder 402 has already been retrieved or when cylinder 402 contains a large amount of unused or unallocated space. In addition, a default minimum number of data blocks 408 or a default ratio could be used when the user does not provide a value. The default number of data blocks 408 could be a value of between eight and eleven or any other suitable value, and the default may vary based on the size of data blocks 408, the size of cylinder 402, the disk technology employed in data-storage facility 120, or other or additional characteristics of DBS 100.

Although FIGS. 4A through 4C illustrate an example data-storage facility 120, various changes may be made to FIGS. 4A through 4C. For example, data-storage facility 120 may include any number of cylinders 402, and each cylinder 402 may include any number of data blocks 408. Also, cylinder index 406 may contain any other or additional information about data blocks 408, and master index 450 may contain any other or additional information about cylinders 402. As a particular example, in cylinder index 406, the ending logical address 424 of a data block 408 could be omitted since it can be calculated using the beginning logical address 422 and the size 426 of the data block 408. Further, while node 105 has been described as retrieving multiple data blocks 408 from data-storage facility 120, node 105 could also individually retrieve data blocks 408 from data-storage facility 120 when desired or appropriate.

Figure 5:
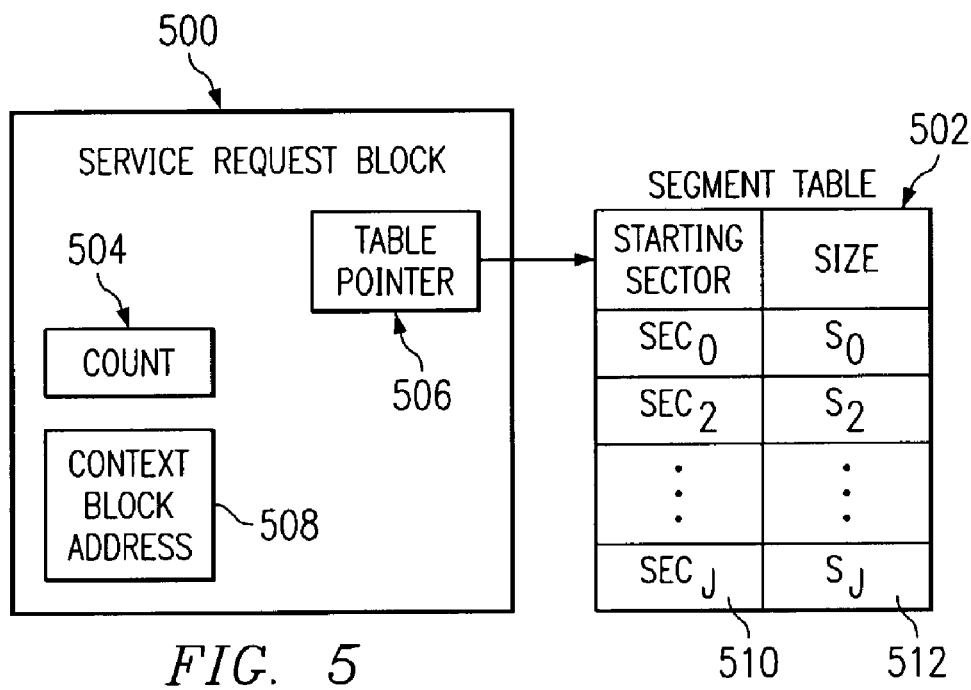
FIG. 5 is a block diagram of a service request block used to retrieve multiple data blocks from a database.

FIG. 5 is a block diagram of a service request block 500 used to retrieve multiple data blocks from a database. In particular, node 105 may generate service request block 500 to retrieve multiple data blocks 408 from a cylinder 402. In the illustrated example, service request block 500 includes a segment table 502, a count 504, a table pointer 506, and a context block address 508. Other service request blocks 500 that include other or additional information could also be used.

Segment table 502 identifies the data blocks 408 to be retrieved from a cylinder 402. Segment table 502 may, for example, contain the starting sector 510 and the size 512 of each data block 408 to be retrieved from cylinder 402. The data blocks 408 identified in segment table 502 may include all or a portion of the data blocks 408 in cylinder 402. The data blocks 408 identified in segment table 502 may also be associated with the same database table or with different database tables. Count 504 identifies the number of data blocks 408 to be retrieved from cylinder 402. For example, count 504 may represent the number of data blocks 408 identified by table 502. Table pointer 506 identifies the location of segment table 502. Context block address 508 identifies the location of a context block in DBS 100. The context block may include a flag indicating whether or not the data blocks 408 can be retrieved collectively from cylinder 402.

In one example system, node 105 may generate a service request block 500 after receiving a request for one or more data blocks 408. The request may take the form of a request for information in a particular data block 408, a request for one or more tables in one or more cylinders 402, or any other suitable request. Based on the request, node 105 may generate the service request block 500 and use the service request block 500 to retrieve one or more data blocks 408 from data-storage facility 120.

In a particular system, node 105 may execute a file system, a file segment subsystem, and database software. In this example, the file system may be responsible for generating the service request block 500. The file system may pass service request block 500 to the file segment subsystem, which may use the service request block 500 to manage retrieval of the identified data blocks 408. The file segment subsystem may also be responsible for managing the storage and release of the identified data blocks 408 and for managing access to the data blocks 408 after retrieval.

The database software may be responsible for actually retrieving the data blocks 408 from the data-storage facility 120. The database software may also be responsible for setting a flag in the context block that controls whether the contents of a cylinder 402 can be collectively retrieved from data-storage facility 120. The flag could enable this function, disable this function, or allow the decision to be made dynamically. For example, DBS 100 could limit the circumstances in which the contents of a cylinder data area 404 can be collectively retrieved. In an example system, DBS 100 allows the collective retrieval of multiple data blocks 408 during sequential table scans and table joins. Table joins typically involve an outer loop that involves scanning one table and an inner loop that involves scanning the same or a different table. In a particular system, DBS 100 may allow the collective retrieval of multiple data blocks 408 when the data blocks 408 are needed for the outer loop of the table join. Also, one type of table join is the RowHashMatch table join. During this type of table join, the outer loop may jump to different data blocks 408, which may or may not be in the same cylinder 402. DBS 100 may allow the collective retrieval of multiple data blocks 408 when the number of data blocks 408 retrieved after a jump exceeds a threshold (such as eight). DBS 100 could also allow the collective retrieval of multiple data blocks 408 when the jump is small enough so that the next data block 408 is in the same cylinder 402 and the number of data blocks 408 skipped during the jump is below a threshold (such as less than eight). To allow DBS node 105 to decide whether or not to allow the collective retrieval of multiple data blocks 408, node 105 could monitor the pattern of access for the outer loop of the table join and determine whether the pattern could benefit from this functionality. This represents only examples of when DBS 100 could allow the collective retrieval of multiple data blocks 408. DBS 100 could allow this function to occur during any other suitable time.

Although FIG. 5 illustrates one example of a service request block 500 used to retrieve multiple data blocks from a database, various changes may be made to FIG. 5. For example, the particular data blocks 408 identified in table 502 are for illustration only. Also, service request block 500 could include other or additional information to facilitate the retrieval of one or more data blocks 408.

Figure 6B:
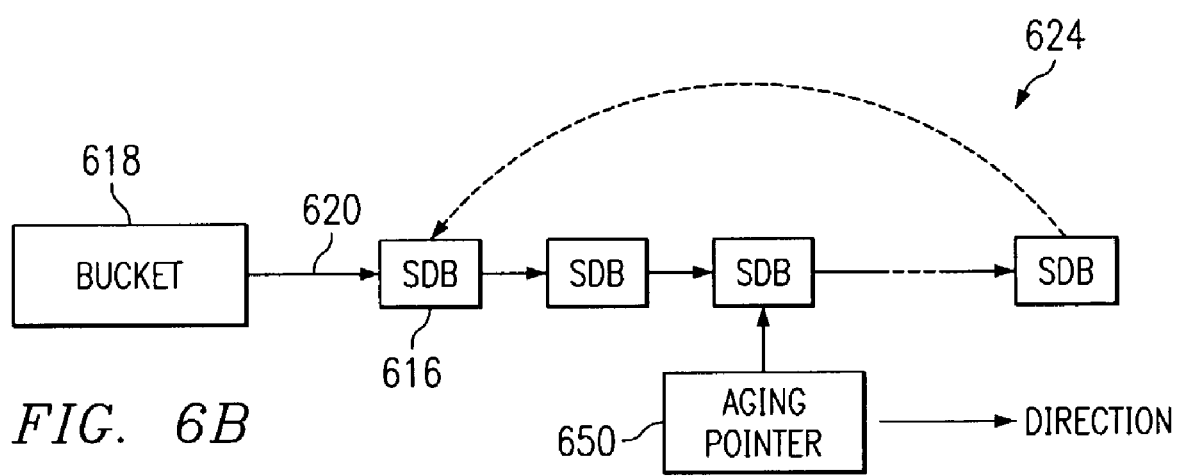
FIGS. 6A and 6B are block diagrams of a memory arrangement used to store information retrieved from a database.
Figure 6A:
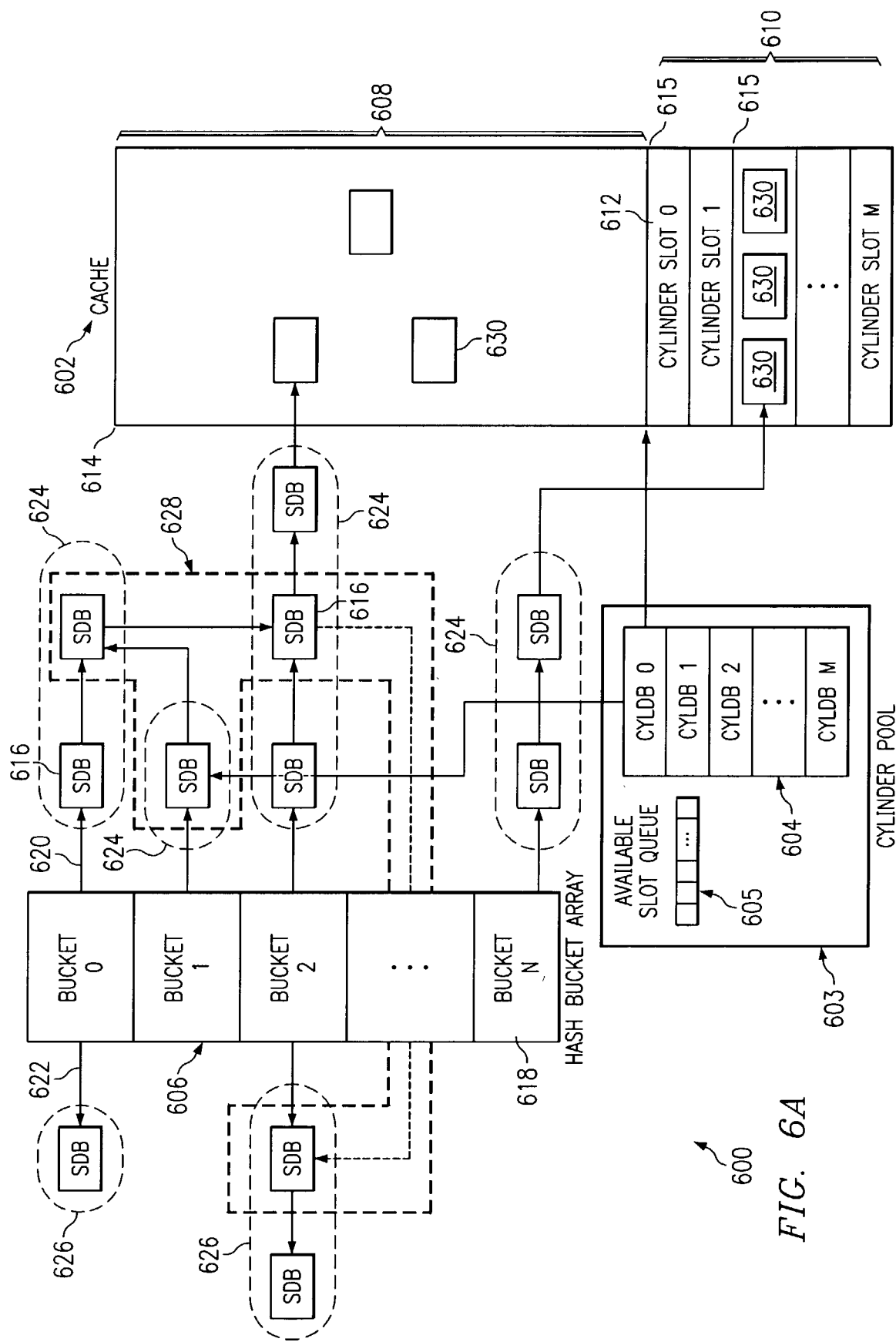

FIGS. 6A and 6B are block diagrams of a memory arrangement 600 used to store information retrieved from a database. Memory arrangement 600 may, for example, be useful in node 105 of FIG. 1. In particular, memory arrangement 600 could be used by node 105 to store the contents of data blocks 408 retrieved from one or more data-storage facilities 120. Memory arrangement 600 may be described with respect to the data-storage facility 120 illustrated in FIGS. 4A through 4C. Memory arrangement 600 could be used to facilitate retrieval of information from any other suitable data-storage facility in any other suitable system.

In the illustrated example, memory arrangement 600 includes a cache 602, a cylinder pool 603, and a hash bucket array 606. Cache 602 stores information retrieved from one or more data-storage facilities 120. In this example, cache 602 is split into a first portion 608 and a second portion 610. The first portion 608 of cache 602 may store data segments 630, which may represent information (such as the contents of data blocks 408 or cylinder indexes 406) retrieved from cylinder 402. The second portion 610 of cache 602 contains cylinder slots 612 that can each store the contents of a cylinder 402 from data-storage facility 120. For example, cylinder slot 612 could store multiple data segments 630 from cylinder 402. Each cylinder slot 612 could, for example, represent 1,936 kilobytes of space.

In one example system, the first portion 608 of cache 602 represents the lower address space of cache 602, and the second portion 610 of cache 602 represents the upper address space of cache 602. Other arrangements of cache 602 could also be used. In a particular example system, a set of one or more cylinder slots 612 in cache 602 is dedicated to each physical and/or virtual processor in node 105. In this example, the cylinder slot 612 dedicated to one processor may not used by another processor, although other systems allowing use of a cylinder slot 612 by multiple processors could be used.

Cache 602 can have any suitable size. In a particular example system, the first portion 608 of cache 602 includes approximately 16 megabytes of memory space for each processing module 110 in node 105. Also, in a particular example system, the second portion 610 of cache 602 includes approximately 20 megabytes of memory space for each processing module 110 in node 105. In this example system, if each cylinder slot 612 has 1,936 kilobytes of space, up to ten cylinder slots 612 could exist in cache 602 for each processing module 110. Other cylinder slots 612 with different sizes could also be used in cache 602.

The sizes of the two portions 608, 610 of cache 602 can be selected in any other suitable manner. For example, the size of first portion 608 and second portion 610 could be selected by a user, system administrator, or other personnel in DBS 100. The size of first portion 608 and second portion 610 could also be controlled dynamically by node 105, such as by allocating additional space to the first portion 608 or second portion 610 when needed.

In a particular example system, the file segment subsystem executed by node 105 may initialize cache 602. For example, the file segment subsystem may identify the amount of physical memory available in node 105. The file segment subsystem could then reserve a particular amount of the memory, such as 32 megabytes, for each physical and/or virtual processor in node 105. Of the remaining memory, a percentage could be allocated to cache 602, such as eighty to one hundred percent of the remaining memory. Also, each processor can map a view of its portion of cache 602 into its virtual address space, and cylinder slots 612 can be generated in cache 602. If an inadequate amount of memory is available in node 105, the file segment subsystem could prevent the formation and use of cylinder slots 612. In this way, if the user requests too much memory space for second portion 610, node 105 may not honor that request.

Figure 7:
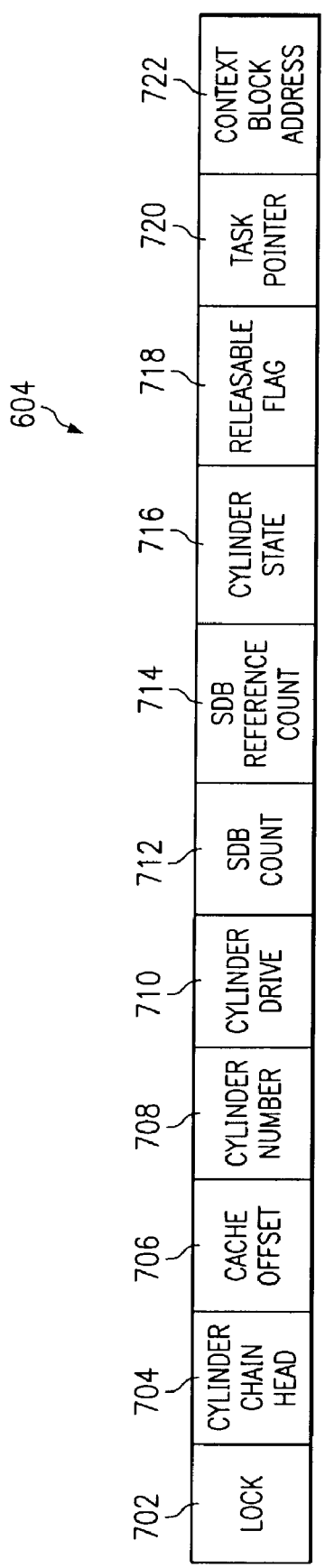
FIG. 7 is a block diagram of a cylinder descriptor block used to describe a cylinder retrieved from a database.

Cylinder pool 603 represents information that supports the storage of all or a portion of a cylinder 402 in a cylinder slot 612. In the illustrated example, cylinder pool 603 includes an array of cylinder descriptor blocks ("CYLDBs") 604 and an available cylinder slot queue 605. A cylinder descriptor block 604 is associated with each cylinder slot 612 in cache 602. A cylinder descriptor block 604 contains information associated with a cylinder slot 612 and/or the contents of the cylinder slot 612. For example, cylinder descriptor block 604 could include the starting location 615 of a cylinder slot 612 in cache 602 and the identity of a cylinder 402 that has been loaded into the cylinder slot 612. One example of a cylinder descriptor block 604 is shown in FIG. 7, which is described below. Queue 605 represents a list of available cylinder slots 612 in cache 602. An available cylinder slot 612 is free to be used by node 105 to store all or a portion of a cylinder 402 retrieved from data-storage facility 120. An identifier, such as the slot number, of a cylinder slot 612 may be inserted into queue 605 when cache 602 is initialized, when the contents of a cylinder slot 612 are no longer being used, when an explicit request to release the cylinder slot 612 is received, or at other appropriate times.

Cylinder descriptor blocks 604 can be used to locate data segments 630 in cache 602. In an example system, each cylinder slot 612 mirrors the offsets in a cylinder 402, so the offset of a data block 408 in cylinder 402 equals the offset of a corresponding data segment 630 in cylinder slot 612. For example, if a data block 408 is 2,048 bytes from the starting address 410 of a cylinder 402, the corresponding data segment 630 would reside 2,048 bytes from the base address 615 of a cylinder slot 612. In this example, the virtual address or offset of a data segment 630 in cache 602 can be computed using the formula:

$$\text{Offset} = \text{SlotStartingAddress} + (\text{SectorNumber} * \text{SectorSize})$$

where SlotStartingAddress represents the starting address 615 of the cylinder slot 612 (stored in the cylinder descriptor block 604 for that cylinder slot 612) in which the data segment 630 resides, SectorNumber represents the sector 409 in which a data block 408 begins in cylinder 402, and SectorSize represents the size of a sector 409. The resulting offset value represents the starting location of a data segment 630 in cache 602.

Figure 8:
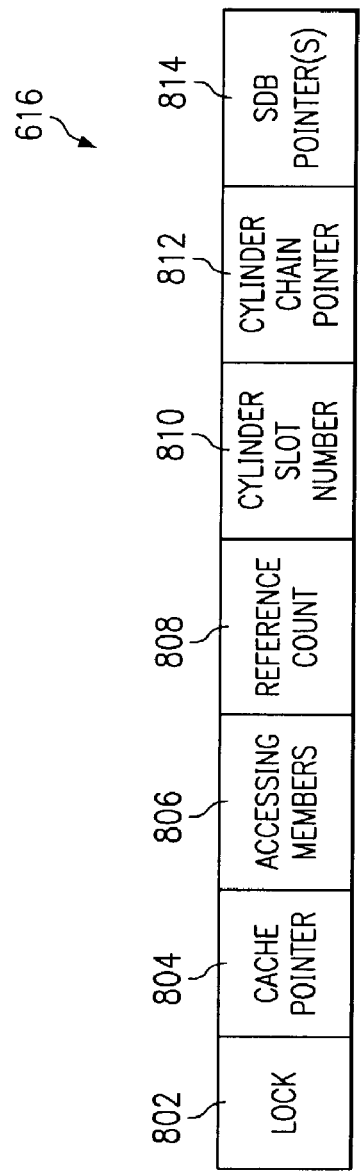
FIG. 8 is a block diagram of a segment descriptor block used to describe a data segment retrieved from a database.

When data segment 630 is stored in cache 602, either individually or as part of a cylinder 402, a segment descriptor block ("SDB") 616 is generated for that data segment 630. A segment descriptor block 616 contains information about its associated data segment 630. For example, the segment descriptor block 616 could identify the starting location in cache 602 where the data segment 630 is stored. If the data segment 630 was loaded into cache 602 as part of a cylinder 402, the segment descriptor block 616 could also identify the cylinder descriptor block 604 associated with the cylinder slot 612 in which the data segment 630 resides. One example of a segment descriptor block 616 is shown in FIG. 8, which is described below. In a particular system, each data segment 630 in cache 602 may be associated with one segment descriptor block 616.

Hash bucket array 606 provides a mechanism to separate and locate segment descriptor blocks 616. For example, if a particular data segment 630 is needed, hash bucket array 606 helps to speed the location of the segment descriptor block 616 associated with that data segment 630. In the illustrated example, hash bucket array 606 defines multiple buckets 618. Each bucket 618 may be associated with one or more segment descriptor blocks 616. When node 105 needs to locate a particular data segment 630, node 105 may perform a hash using information about the data segment 630. As a particular example, node 105 may perform a hash using the drive number, cylinder number, sector number, and length associated with the data segment 630 to produce a value between 0 and N. Node 105 may then access the bucket 618 having that value, search the segment descriptor blocks 616 associated with that bucket 618, and locate the segment descriptor block 616 (if present in memory arrangement 600).

In the illustrated example, each bucket 618 is associated with two pointers 620 and 622 that define an age chain 624 and an access chain 626, respectively. Age chain 624 contains segment descriptor blocks 616 associated with data segments 630 that are not currently being accessed by a task or other process in node 105. Access chain 626 contains segment descriptor blocks 616 associated with data segments 630 that are currently being accessed by a task or other process.

In this example, when a data segment 630 is loaded into cache 602, a segment descriptor block 616 is generated for that data segment 630. At this point, the data segment 630 may not yet have been accessed by a task or other process. As a result, a hash is performed, and the segment descriptor block 616 for that data segment 630 is inserted into the age chain 624 of the appropriate bucket 618. If and when a task or other process wishes to access the data segment 630, the segment descriptor block 616 is removed from the age chain 624 and inserted in the access chain 626 of that bucket 618. When the task or other process stops accessing the data segment 630, the segment descriptor block 616 may be removed from the access chain 626 and reinserted back into the age chain 624. By using these chains 624, 626, node 105 can determine when a data segment 630 is no longer being used by a task or other process. Node 105 can then take steps to make the space occupied by the data segment 630 in cache 602 available for storing other information. Additional details of the age chain 624 and how segment descriptor blocks 616 are inserted into the age chain 624 are shown in FIG. 6B, which is described below. In an example system, segment descriptor blocks 616 may be inserted at the end of an access chain 626, and access chain 626 need not order the segment descriptor blocks 616. Other systems that order the segment descriptor blocks 616 in the access chain 626 could also be used.

When retrieval of information is requested and at least a portion of a cylinder 402 is loaded into a cylinder slot 612, node 105 can generate a segment descriptor block 616 for each data segment 630 in cylinder slot 612 that contains the requested information. Node 105 can then insert those segment descriptor blocks 616 into one or more of the age chains 624. As the various data segments 630 are accessed, the segment descriptor blocks 616 for those data segments 630 may be moved to and from the access chain 626.

When all or a portion of a cylinder 402 is retrieved from data-storage facility 120, the retrieved contents could include data segments 630 that are unrelated to the information requested by mainframe 135 or client computer 140. For example, if processing module 110 is retrieving a table or tables from data-storage facility 120, the retrieved contents of cylinder 402 could include data segments 630 that are unrelated to the table or tables. Also, cylinder 402 may include some amount of unallocated disk space, or space which is not currently being used by data-storage facility 120 to store information. The unallocated disk space may contain information, such as when the space had previously been used to store a database table, that has since been deleted. The data segments 630 that are unrelated to the requested information and the contents of the unallocated disk space could be retrieved from data-storage facility 120, stored in cylinder slot 612, and ignored by node 105. For example, node 105 might not generate a segment descriptor block 616 for the data segments 630 that are unrelated to the requested information or for the contents of the unallocated disk space. In effect, this helps to limit access to the data segments 630 that are unrelated to the requested information and to the contents of the unallocated disk space in cylinder slot 612.

Once the contents of a cylinder 402 are stored in a cylinder slot 612, node 105 could decide to release that cylinder slot 612. This makes the cylinder slot 612 available for storing another cylinder 402. The decision to release a cylinder slot 612 could be made based on an explicit request or on the lack of use of the data segments 630 in the cylinder slot 612. As an example, if an explicit request is received, node 105 can remove all of that cylinder's segment descriptor blocks 616 from the age chains 624. Node 105 could also remove that cylinder's segment descriptor blocks 616 from the access chains 626 as soon as those segment descriptor blocks 616 are no longer being used by a task or other process. At that point, the cylinder slot 612 can be released, and the slot number of the cylinder slot 612 can be inserted into the available cylinder slot queue 605. As another example, all of the segment descriptor blocks 616 associated with a cylinder slot 612 could be in the age chains 624, and each of the data segments 630 associated with those segment descriptor blocks 616 might not have been accessed for a specified amount of time. Because of the lack of use of the data segments 630, node 105 could remove all of that cylinder's segment descriptor blocks 616 from the age chains 624, release the cylinder slot 612, and insert the slot number into queue 605.

As shown in FIG. 6A, the segment descriptor blocks 616 associated with one cylinder slot 612 form a cylinder chain 628 within the age and/or access chains 624, 626. The head of the cylinder chain 628 is also identified in the cylinder descriptor block 604 associated with that cylinder slot 612. The use of cylinder chain 628 may help node 105 to quickly locate the segment descriptor blocks 616 associated with a particular cylinder slot 612. This may be useful, for example, when a task or other process explicitly requests that the contents of a cylinder slot 612 be released. Node 105 could then traverse cylinder chain 628 and remove the segment descriptor blocks 616 from chains 624, 626.

In FIG. 6B, one example of the age chain 624 of memory arrangement 600 is shown in greater detail. In this example, the segment descriptor blocks 616 of age chain 624 form a circular linked list. An aging pointer 650 points to one of the segment descriptor blocks 616 in chain 624. Aging pointer 650 functions to identify the relative length of time the segment descriptor blocks 616 have been in the age chain 624. For example, aging pointer 650 could point to the segment descriptor block 616 that has resided for the longest amount of time in the age chain 624. The segment descriptor block 616 immediately following that segment descriptor block 616 has resided for the second longest amount of time in the age chain 624. The segment descriptor block 616 immediately preceding the segment descriptor block 616 identified by the aging pointer 650 has resided for the least amount of time in the age chain 624.

The use of aging pointer 650 may facilitate the insertion of a new segment descriptor block 616 in age chain 624. In an example system, the new segment descriptor block 616 is placed immediately behind the segment descriptor block 616 identified by the aging pointer 650. Aging pointer 650 may also help to facilitate the removal and replacement of information in cache 602. For example, cache 602 may be full, and node 105 may need to store new data segments 630 in cache 602. To provide space in cache 602 for the new data segments 630, node 105 may access the age chain 624 of one of the buckets 618 and identify the oldest segment descriptor block 616 using the aging pointer 650. Node 105 then removes or "ages" the oldest segment descriptor block 616 from age chain 624, which makes the space occupied by a data segment 630 in cache 602 available for use. The aging pointer 650 moves to the next segment descriptor block 616, which now represents the oldest segment descriptor block 616 in chain 624. If more space is still needed for the new data segments 630, node 105 moves to the next bucket 618 and removes the oldest segment descriptor block 616 in the next age chain 624. If node 105 reaches the end of hash bucket array 606 and more space is still needed for the new data segments 630, node 105 may repeat the process by returning to the first bucket 618 and aging the oldest segment descriptor block 616.

When a segment descriptor block 616 is aged from an age chain 624, the same segment descriptor block 616 may still form part of a cylinder chain 628. This may occur when the data segment 630 associated with the segment descriptor block 616 resides in a cylinder slot 612. In this case, the cylinder descriptor block 604 associated with that cylinder slot 612 maintains a count of all non-aged segment descriptor blocks 616. When a segment descriptor block 616 in a cylinder chain 628 is aged from an age chain 624, the count in cylinder descriptor block 604 is decremented. If and when the count reaches zero, the cylinder slot 612 associated with cylinder descriptor block 604 can be released.

Although FIGS. 6A and 6B illustrate an example memory arrangement 600 used to store information from retrieved database cylinders 402, various changes can be made to memory arrangement 600. For example, while FIG. 6A illustrates a single cache 602 divided into different portions 608, 610, multiple divided or undivided caches could be used. Also, cache 602 may include any suitable number of cylinder slots 612. Further, FIG. 6A illustrates the use of a hash bucket array 606 and segment descriptor blocks 616 for locating various data segments 630 in cache 602. Any other suitable technique or mechanism for locating data segments 630 could also be used in DBS 100. Beyond that, while FIG. 6A illustrates the use of age chain 624 and access chain 626, any other or additional chain or chains could be used to store segment descriptor blocks 616. In addition, the age chain 624 shown in FIG. 6B may include any number of segment descriptor blocks 616, and other mechanisms other than a pointer 650 can be used to insert and/or replace segment descriptor blocks 616 in chain 624.

FIG. 7 is a block diagram of a cylinder descriptor block 604 used to describe a cylinder retrieved from a database. In particular, node 105 may use cylinder descriptor block 604 to manage a cylinder slot 612, which stores the contents of a cylinder 402 retrieved from data-storage facility 120. The fields of cylinder descriptor block 604 shown in FIG. 7 are for illustration only. Other or additional fields can be used to describe a cylinder slot 612 and/or the contents of the cylinder slot 612.

In this example, lock 702 helps to limit access to cylinder descriptor block 604 by two or more processes in node 105. This may, for example, help to prevent the processes from making conflicting changes to cylinder descriptor block 604 at or near the same time. Cylinder chain head 704 identifies the first segment descriptor block 616 in cylinder chain 628.

Cache offset 706 identifies the offset of the associated cylinder slot 612 in cache 602. For example, cache offset 706 could represent the offset of the starting address 615 of the cylinder slot 612 from the cache base address 614. Cylinder number 708 contains the logical cylinder number of the cylinder 402 currently stored in a cylinder slot 612. Cylinder number 708 could, for example, represent the cylinder number 452 contained in master index 450. Cylinder drive 710 represents the drive of data-storage facility 120 in which the identified cylinder 402 resides.

SDB count 712 identifies the number of segment descriptor blocks 616 in the cylinder chain 628 that have not been aged. SDB reference count 714 represents a sum of the number of tasks or other processes that are accessing each data segment 630 represented by a segment descriptor block 616 in the cylinder chain 628. As described below, each segment descriptor block 616 may maintain a count of the number of tasks and other processes accessing a data segment 630. In this example, SDB reference count 714 represents the sum of those values.

Cylinder state 716 identifies the current state of a cylinder 402 associated with the cylinder slot 612. For example, cylinder state 716 could indicate that a cylinder 402 is being loaded, is ready and available for use, or has been released. Releasable flag 718 identifies whether the cylinder slot 612 is releasable and available for storing another cylinder 402. Task pointer 720 points to the task or other process in node 105 that requested retrieval of the cylinder 402 in cylinder slot 612. Context block address 722 identifies the context block associated with at least a portion of the contents of cylinder slot 612.

Although FIG. 7 illustrates one example of a cylinder descriptor block 604 used to describe a cylinder retrieved from a database, various changes may be made to FIG. 7. For example, other or additional fields can be used in cylinder descriptor block 604. Also, the arrangement of the fields in cylinder descriptor block 604 is for illustration only.

FIG. 8 is a block diagram of a segment descriptor block 616 used to describe a data segment retrieved from a database. In particular, node 105 may use segment descriptor block 616 to describe, locate, and manage data segments 630 in cache 602. The fields of segment descriptor block 616 shown in FIG. 8 are for illustration only. Other or additional fields can be used to manage data segments 630.

In this example, lock 802 helps to limit access to segment descriptor block 616 by two or more processes in node 105. Cache pointer 804 identifies the location of the associated data segment 630 in cache 602. For example, cache pointer 804 could identify the starting virtual address of the data segment 630 in cache 602 and the size of the data segment 630.

Accessing members 806 identify each task or other process currently accessing the data segment 630. Reference count 808 identifies the number of tasks and other processes accessing the data segment 630.

The next two fields may be used when a data segment 630 associated with segment descriptor block 616 is loaded as part of a cylinder 402. Cylinder slot number 810 identifies the cylinder slot 612 in which the data segment 630 resides, if it was loaded into cylinder slot 612 as part of a cylinder 402. This value also identifies a cylinder descriptor block 604 in cylinder pool 603. Cylinder chain pointer 812 identifies the next segment descriptor block 616 (if any) in a cylinder chain 628.

One or more SDB pointers 814 allow the segment descriptor segment 616 to reside in the age chain 624 or the access chain 626. For example, one SDB pointer 814 could point to the next segment descriptor segment 616 in age chain 624 or access chain 626. Another SDB pointer 814 could point to the previous segment descriptor segment 616 in age chain 624 or access chain 626.

Although FIG. 8 illustrates one example of a segment descriptor block 616 used to describe a data segment retrieved from a database, various changes may be made to FIG. 8. For example, other or additional fields can be used in segment descriptor block 616. Also, the arrangement of the fields in segment descriptor block 616 is for illustration only.

Figure 9:
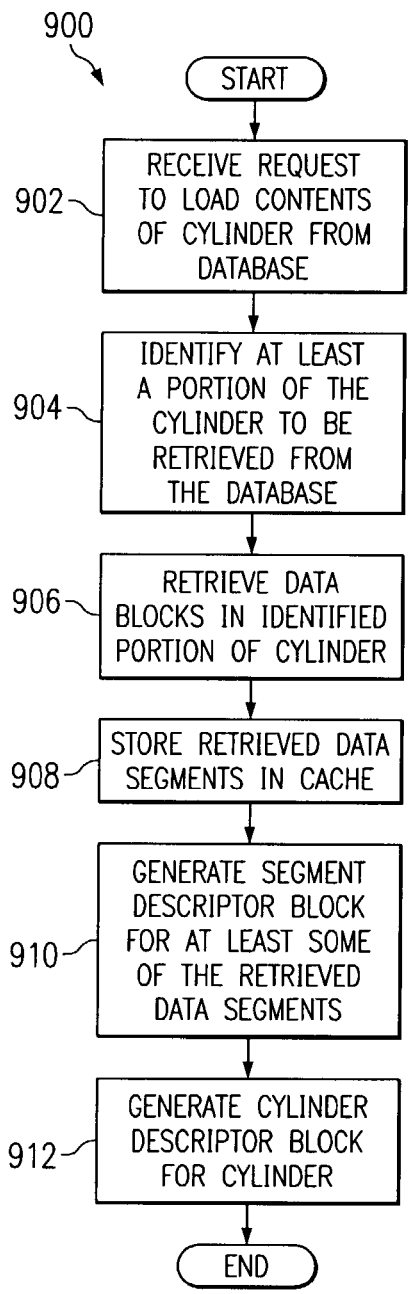
FIG. 9 is a flowchart of a method for retrieving multiple data blocks from a database cylinder.

FIG. 9 is a flowchart of a method 900 for retrieving multiple data blocks from a database cylinder. Method 900 may be described with respect to node 105 of FIG. 1 using the memory arrangement 600 of FIG. 6. Method 900 could also be used by any other system having any other memory arrangement.

Node 105 receives a request to load all or a portion of a cylinder 402 from a data-storage facility 120 at block 902. This may include, for example, node 105 receiving a request from mainframe 135 or client computer 140 to retrieve information from one or more tables. This may also include node 105 locating the desired tables in one or more data-storage facilities 120. This may further include node 105 identifying at least one cylinder 402 containing at least a portion of the requested information.

Node 105 identifies at least a portion of the cylinder 402 to be retrieved from the data-storage facility 120 at block 904. This may include, for example, node 105 retrieving the cylinder index 406 in cylinder 402 and identifying the data blocks 408 that are associated with the requested information. This may also include node 105 identifying the beginning address of the first data block 408 to be retrieved and the ending address of the last data block 408 to be retrieved. This could further include node 105 deciding to retrieve all data blocks 408 in the identified cylinder 402.

Node 105 retrieves the data blocks 408 from the identified cylinder 402 in data-storage facility 120 at block 906. This may include, for example, node 105 retrieving the data blocks 408 from data-storage facility 120 during a single retrieval operation. Node 105 stores the retrieved data blocks 408 at block 908. This may include, for example, node 105 storing the retrieved data blocks 408 as data segments 630 in a cylinder slot 612 in cache 602.

Node 105 generates a segment descriptor block 616 for at least some of the data segments 630 stored in cylinder slot 612 at block 910. This may include, for example, node 105 generating a segment descriptor block 616 shown in FIG. 8. This may also include node 105 performing a hash function to generate a value associated with one of the data segments 630. This may further include node 105 inserting the segment descriptor block 616 into the age chain 624 of the appropriate bucket 618 in hash bucket array 606. In addition, this may include node 105 generating a cylinder chain 628 using the segment descriptor blocks 616 associated with the retrieved cylinder 402. During this process, node 105 may ignore data segments 630 retrieved from cylinder 402 that are unrelated to the requested information. For example, node 105 may not generate a segment descriptor block 616 for those data segments 630. Similarly, node 105 may ignore any retrieved contents of unallocated disk space in cylinder 402.

Node 105 generates a cylinder descriptor block 604 for the cylinder 402 at block 912. This may include, for example, node 105 generating a cylinder descriptor block 604 shown in FIG. 7. This may also include node 105 inserting into the cylinder descriptor block 604 a pointer identifying the first segment descriptor block 616 in cylinder chain 628 and the number of segment descriptor blocks 616 in the cylinder chain 628. This may further include node 105 inserting into cylinder descriptor block 604 the slot number of the cylinder slot 612 in which the data segments 630 are stored.

Although FIG. 9 illustrates one example of a method 900 for retrieving multiple data blocks from a database cylinder, various changes may be made to method 900. For example, the generation of the segment descriptor blocks 616 could occur after the generation of the cylinder descriptor block 604. Also, node 105 could be programmed to automatically retrieve the entire cylinder 402 and need not identify the portion of cylinder 402 to be retrieved.

Figure 10:
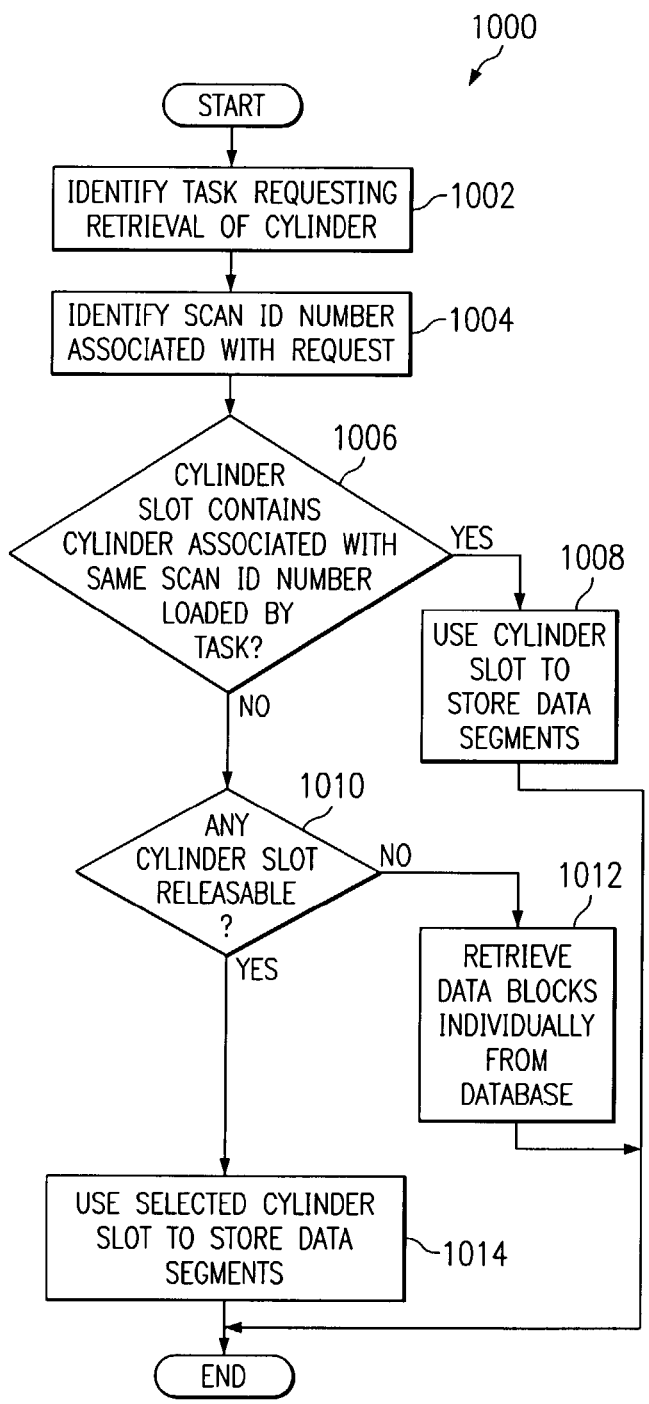
FIG. 10 is a flowchart of a method for identifying a cylinder slot used to store data blocks from a database cylinder.

FIG. 10 is a flowchart of a method 1000 for identifying a cylinder slot used to store data blocks from a database cylinder. Method 1000 may be described with respect to node 105 of FIG. 1 using the memory arrangement 600 of FIG. 6. Method 1000 could also be used by any other system using any other memory arrangement.

Node 105 identifies the task that requested retrieval of a database cylinder 402 at block 1002. This may include, for example, the task communicating a request to node 105, where the request contains a pointer identifying the requesting task. Node 105 identifies a scan identification number associated with the request at block 1004. In an example system, a node 105 may execute a command that involves scanning a database table, and the scan identification number identifies that scan. As a particular example, node 105 may execute a command, such as a join command, that involves scanning two or more tables, such as right and left tables. In this example, multiple scan identification numbers are used, one for the right table and one for the left table. If the right and left tables represent the same database table, multiple scan identification numbers are associated with that table, one for each scan. When a command involves multiple scan identification numbers, node 105 identifies one of the numbers during block 1004. Any suitable logical identifier could be used as a scan identification number to uniquely identify a scan of a table, such as the context block address 508.

Node 105 determines whether any cylinder slots 612 currently contain a cylinder 402 associated with the identified scan identification number that was loaded by the same task at block 1006. This may include, for example, node 105 locking the cylinder pool 603 and examining the cylinder descriptor blocks 604. This may also include node 105 determining if the same task loaded a cylinder 402 associated with the same scan identification number. If so, node 105 uses the same cylinder slot 612 to store data segments 630 for the new cylinder 402 at block 1008. This may include, for example, node 105 locking the cylinder descriptor block 604 for that cylinder slot 612 and setting the releasable flag. This may also include node 105 removing the segment descriptor blocks 616 for that cylinder slot 612 from chains 624, 626 and unlocking the cylinder descriptor block 604 and the cylinder pool 603. This may further include node 105 using the newly released cylinder slot 612 to store the new cylinder 402. In this way, node 105 may allow a task to store information used in a table scan in one cylinder slot 612. When a single table is involved and only one scan is being performed, this may mean that the task can use a single cylinder slot 612. When a single table is involved and multiple scans are being performed (such as in a table join where the right and left tables are the same), this may mean that the task can use one cylinder slot 612 for each of the table scans. When multiple tables are involved, this may mean that the task can use at least one cylinder slot 612 for each table.

Otherwise, node 105 determines whether any cylinder slot 612 in cache 602 is releasable at block 1010. This may include, for example, node 105 locking the cylinder pool 603, examining the available cylinder slot queue 605, and determining whether any cylinder slots 612 are releasable. If none of the cylinder slots 612 are releasable, node 105 retrieves the data blocks 408 in the requested cylinder 402 individually at block 1012. In this case, no cylinder slot 612 is available in cache 602 to hold the contents of the requested cylinder 402, so the data blocks 408 are retrieved individually and stored in cache 602, and node 105 may unlock the cylinder pool 603.

If a cylinder slot 612 in cache 602 is releasable, node 105 uses the selected cylinder slot 612 to store data segments 630 from the requested cylinder 402 at block 1014. This may include, for example, node 105 releasing the lock on cylinder pool 603 and locking the cylinder descriptor block 604 associated with the cylinder slot 612. This may also include node 105 retrieving and storing the data blocks 408 as data segments 630 in the cylinder slot 612. This may further include node 105 removing the identifier of the cylinder slot 612 from queue 605 and unlocking the cylinder descriptor block 604.

Although FIG. 10 illustrates one example of a method 1000 for identifying a cylinder slot used to store data blocks from a database cylinder, various changes may be made to method 1000. For example, method 1000 shows that node 105 limits a task to using one cylinder slot 612 to store cylinders 402 associated with the scan of a table. Node 105 could also allow a task to use any number of cylinder slots 612 to store cylinders 402 associated with the scan of a table.

Figure 11A:
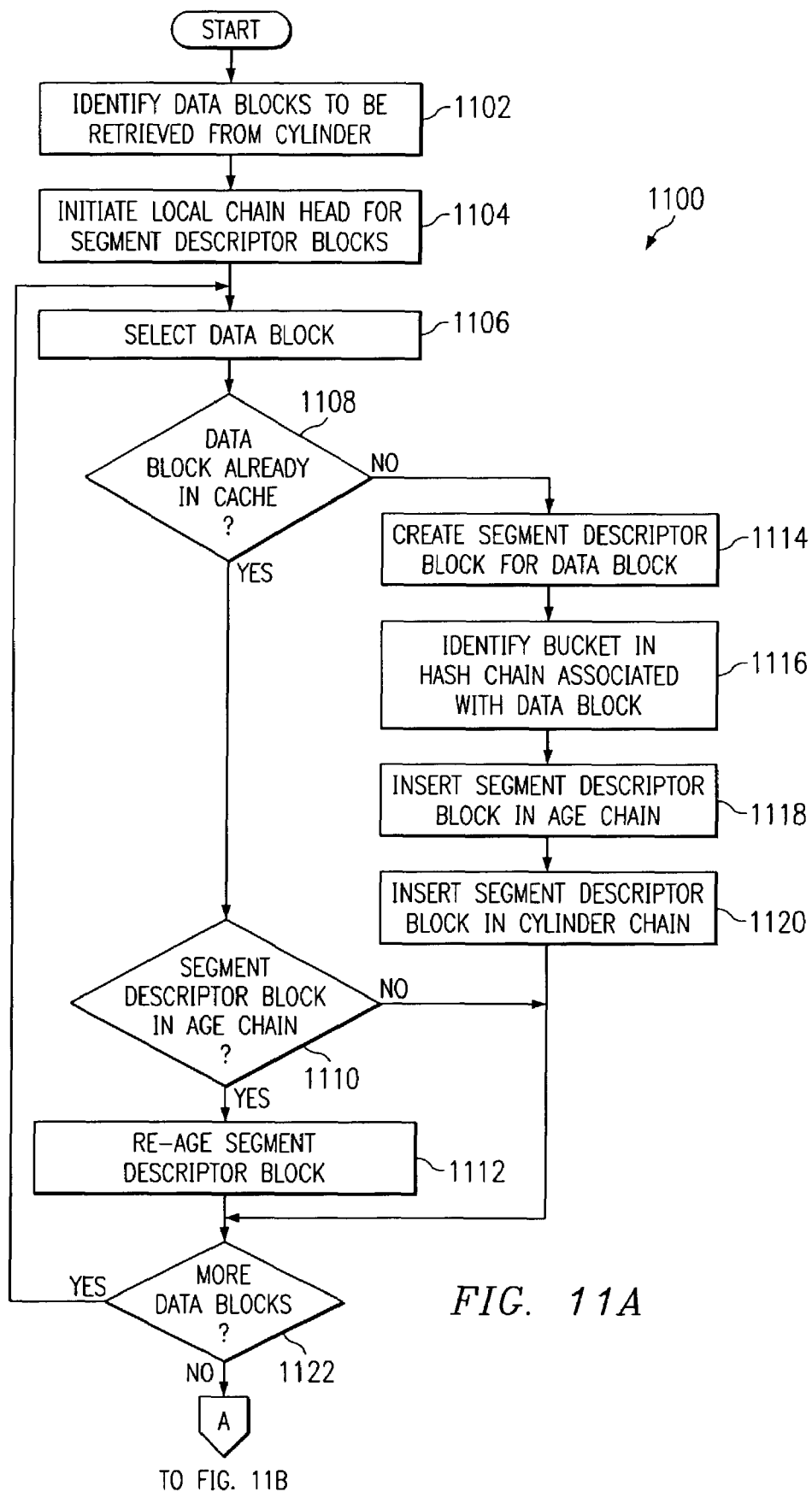
Figure 11B:
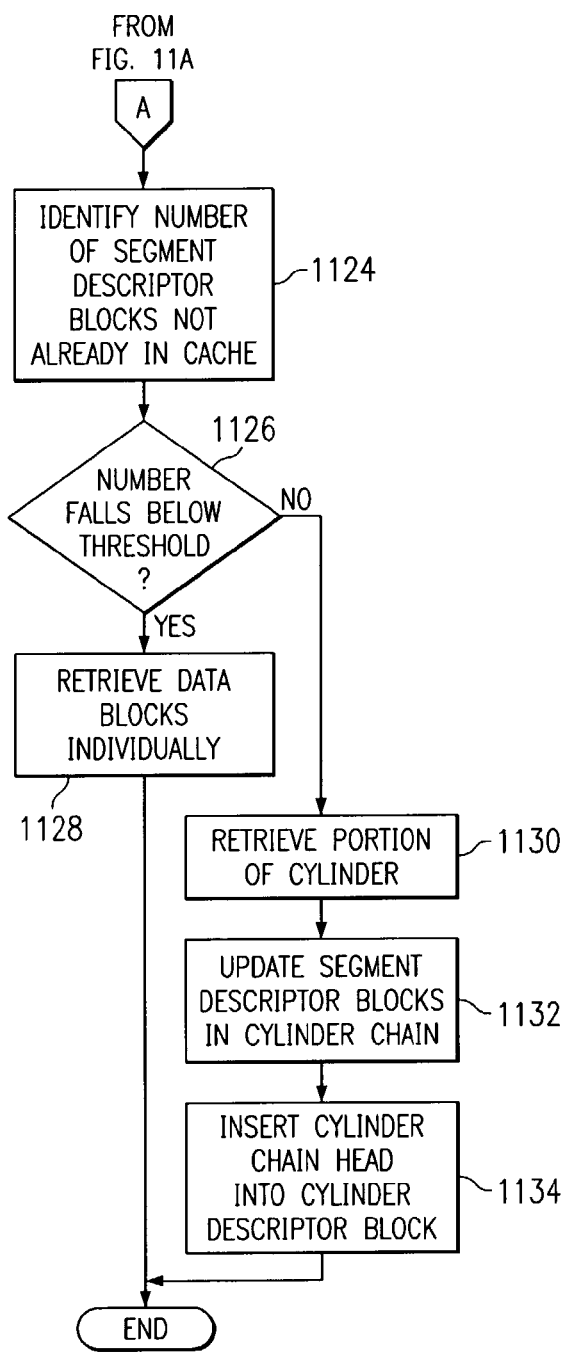

FIGS. 11A and 11B are flowcharts of a method 1100 for generating segment descriptor blocks used to identify data segments from a database. Method 1100 may be described with respect to node 105 of FIG. 1 using the memory arrangement 600 of FIG. 6. Method 1100 could be used by any other system using any other memory arrangement.

Node 105 identifies the data blocks 408 to be retrieved from a cylinder 402 at block 1102. This may include, for example, node 105 identifying one or more tables containing information requested by mainframe 135 or client computer 140. This may also include node 105 identifying a cylinder 402 associated with one or more of the tables, retrieving the cylinder index 406 from that cylinder 402, and identifying the data blocks 408 associated with the requested information.

Node 105 initiates the head of a cylinder chain 628 at block 1104. This may include, for example, node 105 allocating a pointer for use with a new cylinder chain 628. Node 105 selects one of the identified data blocks 408 at block 1106. Node 105 determines whether the selected data block 408 is already in cache 602 at block 1108. This may include, for example, node 105 performing a hash and identifying a bucket 618 associated with the data block 408. This may also include node 105 examining age chain 624 and access chain 626 identified by that bucket 618. This may further include node 105 determining whether the age chain 624 or the access chain 626 contains a segment descriptor block 616 associated with the selected data block 408. If the segment descriptor block 616 resides in either chain 624, 626, node 105 determines whether it resides in the age chain 624 at block 1110. If so, node 105 re-ages the segment descriptor block 616 at block 1112. This may include, for example, node 105 removing the segment descriptor block 616 from the age chain 624 and then re-inserting the segment descriptor block 616 in the age chain 624. In effect, this makes the segment descriptor block 616 look like a newer member of the age chain 624, which increases the amount of time that the segment descriptor block 616 can reside in the age chain 624 before being removed. If the segment descriptor block 616 resides in the access chain 626 at block 1110, node 105 can skip block 1112.

If the selected data block 408 is not already in cache 602 at block 1108, node 105 generates a segment descriptor block 616 for the data block 408 at block 1114. This may include, for example, node 105 allocating space for the segment descriptor block 616. This may also include node 105 locking the new segment descriptor block 616 and placing the segment descriptor block 616 in an "initialization" state. Node 105 identifies a bucket 618 in hash bucket array 606 associated with the new data block 408 at block 1116. This may include, for example, node 105 using the hash value generated during block 1108. Node 105 inserts the new segment descriptor block 616 into the age chain 624 of the identified bucket 618 at block 1118. This may include, for example, node 105 inserting the new segment descriptor block 616 before the aging pointer 650 in age chain 624 as described above. Node 105 also inserts the new segment descriptor block 616 into cylinder chain 628 at block 1120. If the new segment descriptor block 616 is first in the cylinder chain 628, this may include node 105 causing the local chain head generated at block 1104 to point to the new segment descriptor block 616. If not the first segment descriptor block 616 in the cylinder chain 628, this may include node 105 causing the previous segment descriptor block 616 in the local chain 624 to point to the new segment descriptor block 616.

Node 105 determines whether additional data blocks 408 remain to be processed at block 1122. If so, node 105 returns to block 1106 to select and process another data block 408. Otherwise, node 105 identifies the number of segment descriptor blocks 616 that are not already in cache 602 at block 1124. Node 105 determines whether the number of segment descriptor blocks 616 not already in cache 602 falls below a threshold at block 1126. The threshold may represent any suitable number, such as a default value or a value provided by a user, system administrator, or other personnel. In a particular system, the threshold may represent a value of eight. In another system, the threshold may be determined using the average seek time and average transfer rate of the data-storage facility 120. With this information, node 105 can estimate the "break-even" point where collectively retrieving the data blocks 408 would be faster than retrieving the data blocks 408 individually.

If the number of segment descriptor blocks 616 not already in cache 602 falls below the threshold, node 105 retrieves the data blocks 408 individually from the data-storage facility 120 at block 1128. After retrieving the data blocks 408, node 105 may unlock the segment descriptor blocks 616 and place the segment descriptor blocks 616 in an "unmodified" state.

Otherwise, the number of segment descriptor blocks 616 not already in cache 602 equals or exceeds the threshold, and node 105 retrieves at least a portion of the cylinder 402 at block 1130. This may include, for example, node 105 placing the segment descriptor blocks 616 into a "reading" state that indicates the data blocks 408 associated with the segment descriptor blocks 616 are being read. This may also include node 105 identifying the starting sector 409 and the ending sector 409 such that the data blocks 408 to be retrieved are between these sectors 409. This may further include node 105 storing the retrieved portion of cylinder 402 in a cylinder slot 612, where the first sector 409 retrieved from cylinder 402 has the appropriate offset in cylinder slot 612. Part of the retrieved contents of cylinder 402 could include unrequested information or the contents of unallocated space in cylinder 402.

Node 105 updates the segment descriptor blocks 616 in the cylinder chain 628 at block 1132. This may include, for example, node 105 inserting into a segment descriptor block 616 a pointer identifying the physical page chain in cache 602 where a data block 408 is stored, setting the flag to indicate that the data block 408 was loaded as part of a cylinder 402, and inserting the slot number of the cylinder slot 612. Node 105 inserts the head of the cylinder chain 628 into a cylinder descriptor block 604 at block 1134. This may include, for example, node 105 inserting the pointer to the cylinder chain 628 into the cylinder descriptor block 604 associated with the cylinder slot 612.

Although FIGS. 11A and 11B illustrate one example of a method 1100 for generating segment descriptor blocks used to identify data segments from a database, various changes may be made to method 1100. For example, node 105 could identify all data blocks 408 not currently in cache 602 before generating new segment descriptor blocks 616. Also, node 105 could update the new segment descriptor blocks 616 before inserting the new segment descriptor blocks 616 into the age chain 624 and cylinder chain 628.

Figure 12:
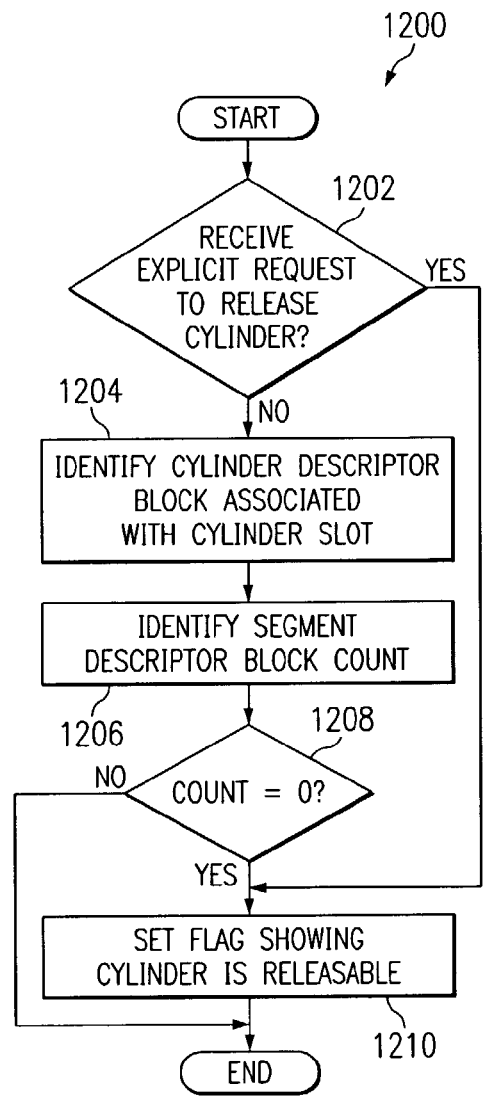
FIG. 12 is a flowchart of a method for releasing a cylinder slot used to store data segments from a database cylinder.

FIG. 12 is a flowchart of a method 1200 for releasing a cylinder slot used to store data segments from a database cylinder. Method 1200 may be described with respect to node 105 of FIG. 1 using the memory arrangement 600 of FIG. 6. Method 1200 could also be used by any other system using any other memory arrangement.

Node 105 determines whether an explicit request to release a cylinder slot 612 has been received at block 1202. This may include, for example, node 105 determining whether an explicit request to release a cylinder slot 612 is received from mainframe 135 or client computer 140. This may also include node 105 determining that the task that requested a cylinder 402 stored in a cylinder slot 612 has been aborted or otherwise terminated. If an explicit request is received, node 105 sets a flag showing that the cylinder slot 612 is releasable at block 1210. This may include, for example, node 105 setting flag 718 in cylinder descriptor block 604 to indicate that the cylinder slot 612 containing a cylinder 402 can be released. At that point, node 105 could remove the segment descriptor blocks 616 from chains 624, 626 and use the cylinder slot 612 to store another cylinder 402.

Otherwise, no explicit request is received, and node 105 identifies the cylinder descriptor block 604 associated with a cylinder slot 612 at block 1204. Node 105 identifies the number of segment descriptor blocks 616 associated with the cylinder slot 612 that have not been aged at block 1206. This may include, for example, node 105 identifying count 712 in cylinder descriptor block 604. Node 105 determines if the number of segment descriptor blocks 616 that have not been aged equals zero at block 1208. If so, this means that the data segments 630 in the cylinder slot 612 are not being used, and node 105 sets the flag showing that the cylinder slot 612 is releasable at block 1210.

Although FIG. 12 illustrates one example of a method 1200 for releasing a cylinder slot used to store data segments from a database cylinder, various changes may be made to method 1200. For example, node 105 could check the contents of cylinder descriptor block 604 before checking if an explicit request has been received.

The text above described one or more specific embodiments of a broader invention. The invention also is carried out in a variety of alternative embodiments and thus is not limited to those described here. For example, while the invention has been described here in terms of a DBMS that uses a massively parallel processing ("MPP") architecture, other types of database systems, including those that use a symmetric multiprocessing ("SMP") architecture, are also useful in carrying out the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for retrieving information from a database, the method comprising:
    receiving a request to retrieve a first plurality of data segments associated with a table in the database;
    identifying a cylinder comprising a second plurality of data segments, the second plurality of data segments including the first plurality of data segments;
    determining if the first plurality of data segments exceeds a threshold number of data segments;
    retrieving the second plurality of data segments during a single retrieval operation if the first plurality of data segments exceeds the threshold number of data segments; and
    storing the retrieved data segments in a cache.

2. The method of claim 1, further comprising:
    generating a segment descriptor block for each of at least some of the retrieved data segments,
    wherein each segment descriptor block identifies a location of a corresponding data segment in the cache.

3. The method of claim 2, wherein each segment descriptor block further comprises a lock to limit access to the respective segment descriptor block by two or more processes.

4. The method of claim 2, wherein a segment descriptor block is generated only for each of the first plurality of data segments.

5. The method of claim 2, wherein each segment descriptor block identifies a starting virtual address and a size of the corresponding data segment in the cache.

6. The method of claim 2, further comprising:
    inserting each segment descriptor block into at least one of a plurality of first chains.

7. The method of claim 6, further comprising:
    moving a segment descriptor block from at least one of the plurality of first chains to one of a plurality of second chains when the associated data segment is accessed.

8. The method of claim 7, further comprising:
    moving the segment descriptor block from the one of the plurality of second chains back to the at least one of the plurality of first chains when the associated data segment is no longer being accessed.

9. The method of claim 6, wherein each of the plurality of first chains comprises an age chain containing segment descriptor blocks associated with data segments that are not currently being accessed.

10. The method of claim 7, wherein each of the plurality of second chains comprises an access chain containing segment descriptor blocks associated with data segments that are currently being accessed.

11. The method of claim 1, wherein the threshold number of data segments is greater than or equal to eight.

12. The method of claim 11, wherein the threshold number of data segments is less than or equal to eleven.

13. A method for retrieving information from a database, the method comprising:
    receiving a request to retrieve a first plurality of data segments associated with a table in the database;
    identifying a cylinder comprising a second plurality of data segments, the second plurality of data segments including the first plurality of data segments;
    determining if a ratio of the first plurality of data segments to the second plurality of data segments exceeds a threshold value;
    retrieving the second plurality of data segments during a single retrieval operation if the ratio of the first plurality of data segments to the second plurality of data segments exceeds the threshold value; and
    storing the retrieved data segments in a cache.

14. A system for retrieving information from a database, the system comprising:
    at least one computer readable medium; and
    logic encoded on the at least one computer readable medium, the logic operable when executed to:
        receive a request to retrieve a first plurality of data segments associated with a table in the database;
        identify a cylinder comprising a second plurality of data segments, the second plurality of data segments including the first plurality of data segments;
        determine if the first plurality of data segments exceeds a threshold number of data segments;
        retrieve the second plurality of data segments during a single retrieval operation if the first plurality of data segments exceeds the threshold number of data segments; and
        store the retrieved data segments in a cache.

15. The system of claim 14, wherein the logic is further operable to:
    generate a segment descriptor block for each of at least some of the retrieved data segments,
    wherein each segment descriptor block identifies a location of a corresponding data segment in the cache.

16. The system of claim 15, wherein each segment descriptor block further comprises a lock to limit access to the respective segment descriptor block by two or more processes.

17. The system of claim 15, wherein a segment descriptor block is generated only for each of the first plurality of data segments.

18. The system of claim 15, wherein each segment descriptor block identifies a starting virtual address and a size of the corresponding data segment in the cache.

19. The system of claim 15, wherein the logic is further operable to:
    insert each segment descriptor block into at least one of a plurality of first chains.

20. The system of claim 19, wherein the logic is further operable to:
    move a segment descriptor block from at least one of the plurality of first chains to one of a plurality of second chains when the associated data segment is accessed.

21. The system of claim 20, wherein the logic is further operable to:

move the segment descriptor block from the one of the plurality of second chains back to the at least one of the plurality of first chains when the associated data segment is no longer being accessed.

22. The system of claim 19, wherein each of the plurality of first chains comprises an age chain containing segment descriptor blocks associated with data segments that are not currently being accessed.

23. The system of claim 20, wherein each of the plurality of second chains comprises an access chain containing segment descriptor blocks associated with data segments that are currently being accessed.

24. The system of claim 14, wherein the threshold number of data segments is greater than or equal to eight.

25. The system of claim 24, wherein the threshold number of data segments is less than or equal to eleven.

26. A system for retrieving information from a database, the system comprising:

at least one computer readable medium; and logic encoded on the at least one computer readable medium, the logic operable when executed to:
    receive a request to retrieve a first plurality of data segments associated with a table in the database;
    identify a cylinder comprising a second plurality of data segments, the second plurality of data segments including the first plurality of data segments;
    determine if a ratio of the first plurality of data segments to the second plurality of data segments exceeds a threshold value;
    retrieve the second plurality of data segments during a single retrieval operation if the ratio of the first plurality of data segments to the second plurality of data segments exceeds the threshold value; and
    store the retrieved data segments in a cache.

\* \* \* \* \*

UNITED STATES PATENT AND TRADEMARK OFFICE
Certificate

Patent No. 7,203,691 B2　　　　　　　　　　　　　　　　　　　　　　Patented: April 10, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Bhashyam Ramesh, San Diego, CA (US); Steven B. Cohen, Redondo Beach, CA (US); John R. Catozzi, San Diego, CA (US); Kassem Awada, Torrance, CA (US) ; and Albert Lam, San Diego, CA (US).

Signed and Sealed this Fifteenth Day of February 2011.

Vincent N. Trans
*Supervisory Patent Examiner*
Art Unit 2100
Technology Center 2100